United States Patent Office 3,104,765
Patented Sept. 24, 1963

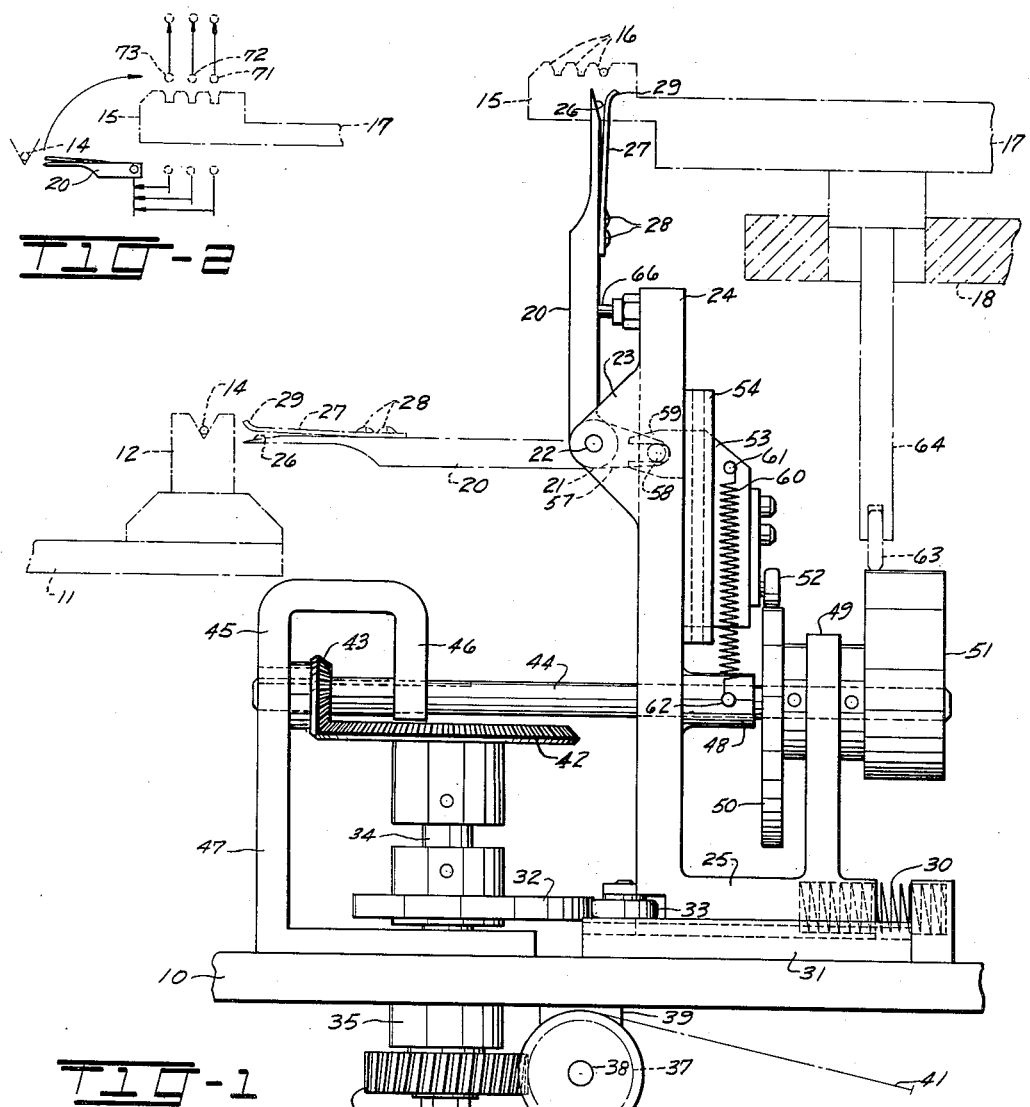

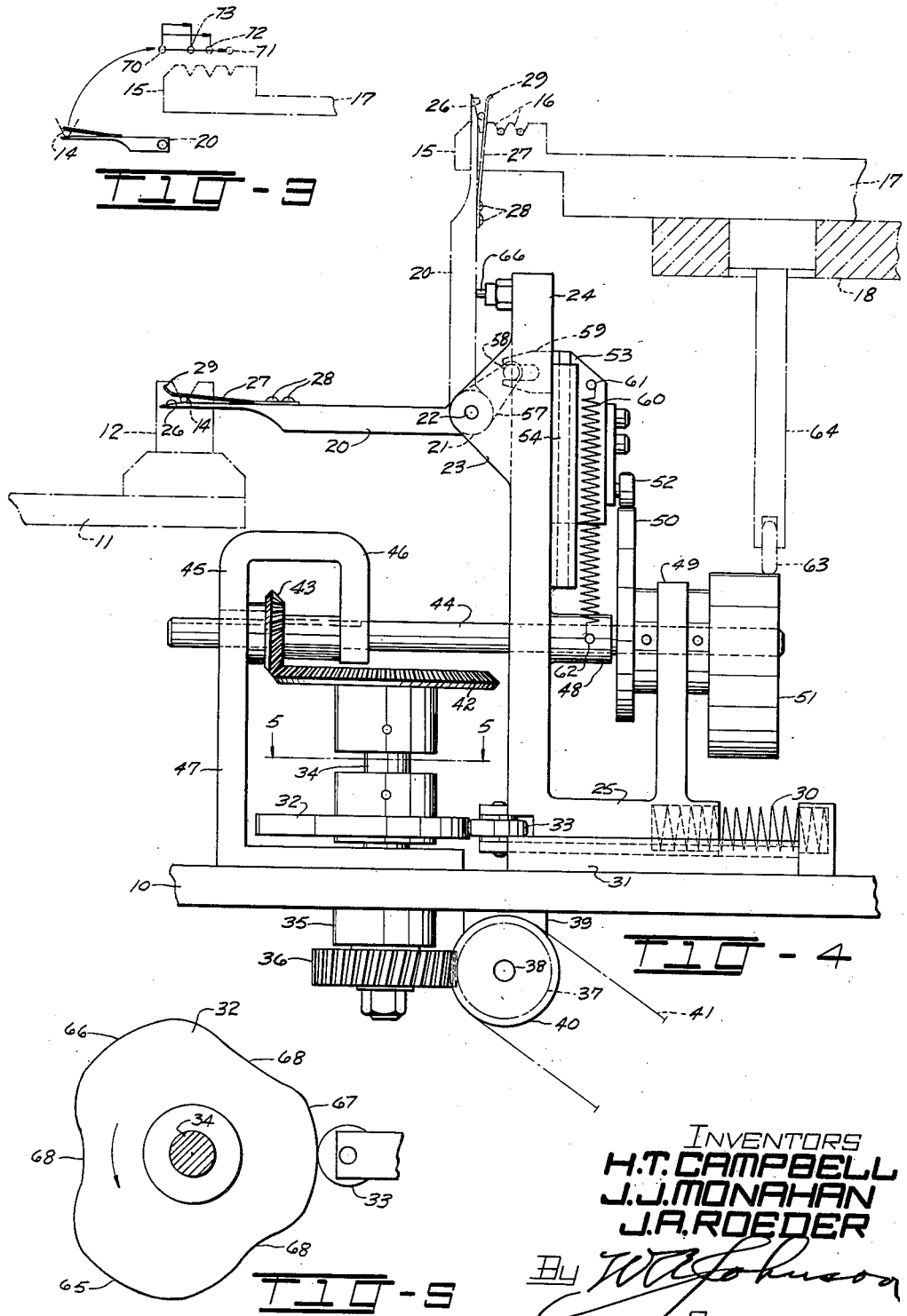

3,104,765
ARTICLE TRANSFER APPARATUS
Hobart T. Campbell and Jack J. Monahan, Allentown, and Joseph A. Roeder, Quakertown, Pa., assignors to Western Electric Company Incorporated, New York, N.Y., a corporation of New York
Filed Dec. 8, 1961, Ser. No. 158,049
6 Claims. (Cl. 214—1)

This invention relates to article transfer apparatus, particularly apparatus for transferring partially completed components from an assembly unit to molds of a finishing unit.

In the present instance, the components being assembled and completed in adjacent turret type units have lead wires extending from opposing ends of each assembly disposed in nests of a first turret of the type shown in applicants' co-pending application, Serial No. 157,965, filed December 8, 1961. These assemblies are to be transferred to cavities of molds of a second turret where the central or assembled portions of the components are embedded in a molding compound.

The object of the invention is an apparatus which is highly efficient in transferring articles, such as the component assemblies, from the nest of the first turret to the molds of the second turret.

According to the object, an arm, pivotally supported at one end, has means mounted at the other end to removably grip the leads of the components when moved into a transfer station and associated means to impart movements to the arm to remove the article or components from the nests and locate them in cavities of molds disposed successively in the transfer station.

Other objects and advantages will be apparent from the following detailed description when considered in conjunction with the accompanying drawings wherein:

FIG. 1 is a side elevational view of the apparatus mounted at a transfer station with respect to first and second turrets;

FIGS. 2 and 3 are schematic illustrations of movements of the transfer arm and a mold at the transfer station;

FIG. 4 is a side elevational view similar to FIG. 1 illustrating different positions of the transfer arm; and FIG. 5 is a horizontal sectional view of one of the cams, the view taken along the line 5—5 of FIG. 4.

The apparatus is mounted on a support 10 positioned relative to a first turret 11 having radially positioned nests 12 to receive articles or component assemblies 14 which, in actual structure, include lead wires extending in opposing directions from their overlapping inner ends between which wafers are secured to complete the assembly in each nest, prior to reaching the transfer station illustrated in FIGS. 1 and 4. These assemblies are to be transferred to cavities of molds 15, the molds, in the present instance, having three cavities 16 disposed at given spaced positions. The mold 15 actually is the lower mold member of a complete mold shown more in detail in the aforementioned co-pending application, the upper mold members not being necessary to illustrate the present invention.

The mold 15 is mounted on, or made a part of, elements 17 supported by a second turret 18 for movement between the position shown in FIGS. 1 and 4, the normal position for the mold members being shown in FIG. 4 with their elements 17 resting on the turret 18. The molds 15 are positioned radially about the turret 18 and, in the present instance, the turret 18 is indexed only once for every three indexing movements of the first turret 11 so that the three cavities in each mold 15 may be filled individually by the transfer apparatus.

The transfer apparatus includes a transfer arm 20 which appears to be a single arm but, in reality, it is a double arm or a U-shaped structure having spaced legs or arms 20 adapted to straddle or, be positioned one upon each side of each nest 12 in the transfer station, to engage and removably hold the leads of each component assembly 14. The inner portion of the arm or arms 20, indicated at 21, is pivotally supported at 22 on a portion 23 of a vertical member 24 of a carriage 25. The outer ends of the arms have curved surfaces 26 leading out to their extreme ends or edges to move beneath their respective leads of the assemblies 14 so that through the assistance of resilient members 27, fixed at 28, and having outwardly turned ends 29, the leads or outer ends of the components may be gripped and removed from the nest 12 during rocking movement of the arms 20 about the pivot 22.

The carriage 25 is supported for movement toward the nest 12 by a spring 30 on a suitable guide 31 and moved away from the nest by a cam 32 engaging a roller 33 supported by the carriage 25. The cam 32 is mounted on a shaft 34 which is journalled in suitable bearings 25 mounted on the support 10. The lower end of the shaft 34 has a helical gear 36 mounted thereon and interengaging a helical gear 37 of a shaft 38 rotatably supported by a bearing unit 39 fixed to the under part of the support 10.

A suitable single drive, represented by a sprocket 40 mounted on the shaft 38, and a chain 41 driven by a power means, not shown, is adapted to cause rotation of the shaft 34 through a partial or ⅓ cycle during every interval of rest of the shaft turret 11 to locate a nest 12 in the transfer station. A large beveled gear 42 is mounted on the upper end of the shaft 34 and interengages a small beveled gear 43 which is keyed to a shaft 44 but held against axial movement between portions 45 and 46 of a bracket 47, the bracket being mounted on the support 10. In the present instance, the ratio of the gears 42 and 43 is 3 to 1 so that during every one-third cycle of the gear 42, the gear 43 and the shaft 44 will be rotated one complete cycle.

The shaft 44 is journalled in suitable bearings 48 and 49 of the carriage 25 and has cams 50 and 51 mounted thereon. The cam 50 engages a roller 52 of an actuator 53 which is in the form of a slide mounted for movement between guides 54, only one of which is shown. The guides 54 are mounted on the vertical portion 24 of the carriage which portion is bifurcated or provided with an opening adapted to receive a projection 57 of the central portion 21 of the arms 20 which carries a pin 58 receivable in a bifurcated portion 59 of the actuator 53. The actuator 53 is provided with one or more springs 60 connected at their ends to pins 61 of the actuator 53 and pins 62 of the bearing 48.

The cam 51 is of sufficient width to move with the carriage 25, yet maintain engagement with a roller or cam follower 63 supported by a rod 64 mounted on each element 17 of each mold 15. During each indexing movement of the turret 18, the roller 63 of each element 17 is moved into engagement with the cam 51 and it is the function of the cam 51 to raise the element 17 and its mold 15 during each cycle of operation of the shaft 44 to cause the molds to receive in their respective cavities, the assemblies or articles 14 and remove them from the arms 20. An adjustable stop 66, supported by the vertical portion 24 of the carriage 25, is positioned to be engaged by one or both of the arms 20 to serve as a locating means for the arms when in upward positions.

The cam 32 has three high portions 65, 66, and 67 with intermediate low portions 68. The low portions 68 are equal distances from the axis of the shaft 34 and determine the movement of the arms when in the horizontal position shown in FIG. 1 to the gripping position shown in FIG. 4 adjacent the nest 12. The high portions represent the positioning of the arms or particularly the article or component held by the arms when in the upper position with respect to the different cavities 16. The high portion 65 is positioned the greatest distance from the axis of the shaft 34 and is to position the article or component held by the arms 20 in registration with the innermost cavity 16, that cavity located at the right or nearest the center of the turret 18. The next high portion 66 serves to locate the arms with the component in registration with the central cavity and the high portion 67 is to locate the arms with the components in registration with the outermost cavity of the mold in the transfer station.

Operation

As previously stated, the first turret 11 indexes during certain intervals to locate nests 12 with single articles or component assemblies 14 successively at the transfer station. During every third indexing of the first turret 11, the turret 18 is indexed to locate an empty mold with three cavities therein at the transfer station. The apparatus is operated according to the intervals of rest of the first turret and will operate once during the rest interval of this turret to transfer the article or component assembly 14 from the nest 12 to its respective cavity of the mold 15.

In other words, there is a series of operations for each interval of rest of the second turret 18, the first of this series having been completed according to the illustration in FIG. 1 where the arms 20, in their vertical positions, have transferred an article 14 above the innermost cavity of the mold 15 and the cam 51 has raised the mold to effectively remove the article from the arms 20. Following this action, the cam 50 will move the actuator 53 upwardly to rock the arms 20 to the horizontal position to align the fingers, represented by the outer ends 26 and the resilient members 27 of the arms with the leads of the next component assembly.

At this time, the high portion 65 which would be engaging the roller 33 of the carriage 25, would be moving away from the roller allowing the carriage to be moved by the spring 30 to move the arms into position to engage the leads of the next component, while the roller moves into the adjacent low portion 68 of the cam 32. This action continues through the combined actions of the cams 32 and 50 for operating the arms, the cam 50 actually doing the pivoting of the arms 20, between the horizontal and vertical positions, and the carriage 25 through the function of the cam 32 causing the engagement of the arms with the successive articles or component leads.

Through these actions, there is a succession of movements of the arms to engage an assembly 14 and move it into registration with the innermost activity of each mold at the transfer station, after which the mold is moved upwardly through action of the cam 51, to locate the assembly in the innermost cavity, after which an assembly, in a similar manner, is fed to the central cavity and finally an assembly is fed to the outermost cavity, after which the second turret 18 indexes to bring an empty mold 15 into the transfer station to receive its series of three articles or component assemblies. These actions are illustrated in FIGS. 2 and 3.

FIG. 2 illustrates mainly the return actions of the arms 20 to the horizontal locations and the distance of movement in each instance, resulting from the varied distances of movement of the carriage traveling from the respective high portions of the cam 53 to their low portions 68, so that, in each instance, the component or article in the nest will be engaged.

FIG. 3 illustrates mainly the movement of the arms 20 from the horizontal position, shown in FIG. 4, to vertical position where the component will be located at 70, after which the respective high portions will be illustrated in their order at 71, 72, and 73.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:
    a fixed support mounted adjacent the transfer station,
    a carriage mounted for movement relative to the turrets on the support,
    an arm pivotally mounted at one end on the carriage,
    means mounted at the other end of the arm to removably grip leads of components in nests at the transfer station,
    means to move the carriage to cause the arm to grip the component in the nest,
    means to rock the arm about the pivot to position the component carried thereby above the mold at the transfer station,
    a drivable means adapted to move through successive cycles to move the arm varied distances relative to the mold to locate components in registration with the different cavities of the mold at the transfer station,
    each mold being supported by the second turret for vertical movement and has a cam follower, and
    a cam supported by the carriage and operable through successive cycles to cause upward movement of the mold at the transfer station to remove each component from the arm for each cavity in the mold.

2. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:
    a fixed support mounted adjacent the transfer station,
    a carriage mounted for movement relative to the turrets on the support,
    an arm pivotally mounted at one end on the carriage,
    means mounted at the other end of the arm to removably grip leads of components in nests at the transfer station,
    means to move the carriage to cause the arm to grip the component in the nest,
    means to rock the arm about the pivot to position the component carried thereby above the mold at the transfer station,
    a drive means carried by the support and operable during intervals of rest of the first turret,
    the means to move the carriage including a cam rotated about an axis by the drive means and having high portions equal in number to the cavities in each mold spaced varied distances from the axis comparable to the given spaced distances of the cavities of the mold to move the carriage to cause the assembled components carried by the arm to be positioned successively to enter the different cavities of the mold when the arm is adjacent the mold.

3. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:
    a fixed support mounted adjacent the transfer station,
    a carriage mounted for movement relative to the turrets on the support,
    an arm pivotally mounted at one end on the carriage, means mounted at the other end of the arm to removably grip leads of components in nests at the transfer station, means to move the carriage to cause the arm to grip the component in the nest, means to rock the arm about the pivot to position the component carried thereby above the mold at the transfer station, a drive means carried by the support and operable during intervals of rest of the first turret, the means to move the carriage including a cam rotated about an axis by the drive means and having high portions equal in number to the cavities in each mold spaced varied distances from the axis comparable to the given spaced distances of the cavities of the mold to move the carriage to cause the assembled components carried by the arm to be positioned successively to enter the different cavities of the mold when the arm is adjacent the mold, the cam having low portions interposed between the high portions and inwardly of the cam to like distances from the axis, and a cam follower mounted on the carriage and adapted to control movement of the carriage to move the arm to grip the successive assembled components of the nests.

4. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:

a fixed support mounted adjacent the transfer station, a carriage mounted for movement relative to the turrets on the support, an arm pivotally mounted at one end on the carriage, means mounted at the other end of the arm to removably grip leads of components in nests at the transfer station, means to move the carriage to cause the arm to grip the component in the nest, means to rock the arm about the pivot to position the component carried thereby above the mold at the transfer station, a single drive carried by the support and operable for predetermined intervals during each interval of rest of the first turret, the rocking means for the arm including an actuator for the arm supported by the carriage, a cam operatively connected and driven through single cycles during each interval of operation of the drive means to cause the actuator to move the arm from a receiving position adjacent the nest in the transfer station to a position above the mold at the transfer station and subsequently back to the receiving position, and a second cam operatively connected to and driven through single cycles during each interval of operation of the drive means to move the mold at the transfer station from a normal down position to an up position, to cause the mold to remove the assembled component from the arm, and back to the normal position.

5. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:

a fixed support mounted adjacent the transfer station, a carriage mounted for movement relative to the turrets on the support, an arm pivotally mounted at one end on the carriage, means mounted at the other end of the arm to removably grip leads of components in nests at the transfer station, means to move the carriage to cause the arm to grip the component in the nest, means to rock the arm about the pivot to position the component carried thereby above the mold at the transfer station, a single drive carried by the support and operable for predetermined intervals during each interval of rest of the first turret, the rocking means for the arm including an actuator for the arm supported by the carriage, a cam operatively connected and driven through single cycles during each interval of operation of the drive means to cause the actuator to move the arm from a receiving position adjacent the nest in the transfer station to a position above the mold at the transfer station and subsequently back to the receiving position, a second cam operatively connected to and driven through single cycles during each interval of operation of the drive means to move the mold at the transfer station from a normal down position to an up position, to cause the mold to remove the assembled component from the arm, and back to the normal position, and the means for moving the carriage including a third cam operatively connected to and driven through partial cycles, the third cam having high portions equal in number to the number of cavities in each mold and spaced from the axis of the third cam varied distances comparable to the distances the cavities in each mold are spaced from each other to move the carriage varied distances relative to the mold to cause successive assembled components of the arm to be located adjacent the successive cavities.

6. An apparatus for transferring assembled components, with outwardly extending leads from successive nests of a first turret to molds having groups of cavities therein spaced given distances apart of a second turret while the turrets are at rest at a transfer station between indexing movements of the turrets, comprising:

a fixed support mounted adjacent the transfer station, a carriage mounted for movement relative to the turrets on the support, an arm pivotally mounted at one end on the carriage, means mounted at the other end of the arm to removably grip leads of components in nests at the transfer station, means to move the carriage to cause the arm to grip the component in the nest, means to rock the arm about the pivot to position the component carried thereby above the mold at the transfer station, a single drive carried by the support and operable for predetermined intervals during each interval of rest of the first turret, the rocking means for the arm including an actuator for the arm supported by the carriage, a cam operatively connected and driven through single cycles during each interval of operation of the drive means to cause the actuator to move the arm from a receiving position adjacent the nest in the transfer station to a position above the mold at the transfer station and subsequently back to the receiving position, a second cam operatively connected to and driven through single cycles during each interval of operation of the drive means to move the mold at the transfer station from a normal down position to an up position, to cause the mold to remove the assembled component from the arm, and back to the normal position, the means for moving the carriage including a third cam operatively connected to and driven through partial cycles, the third cam having high portions equal in number to the number of cavities in each mold and spaced from the axis of the third cam varied distances comparable to the distances the cavities in each mold are spaced from each other to move the carriage varied distances relative to the mold to cause successive assembled components of the arm to be located adjacent the successive cavities, and the third cam having low portions interposed between the high portions and like distances from the axis of the third cam to control movement of the carriage to move the arm relative to each nest in the transfer station to grip the leads of the components.

References Cited in the file of this patent
UNITED STATES PATENTS

| | | |
|---|---|---|
| 230,638 | King | Aug. 3, 1880 |
| 584,987 | Church | June 22, 1897 |
| 917,627 | Linzotte | Apr. 6, 1909 |
| 2,665,814 | Brooks | Jan. 12, 1954 |
| 2,869,739 | Davis | Jan. 20, 1959 |